(No Model.)
W. S. PAYNE.
RADIATOR CONNECTION.
No. 302,021. Patented July 15, 1884.
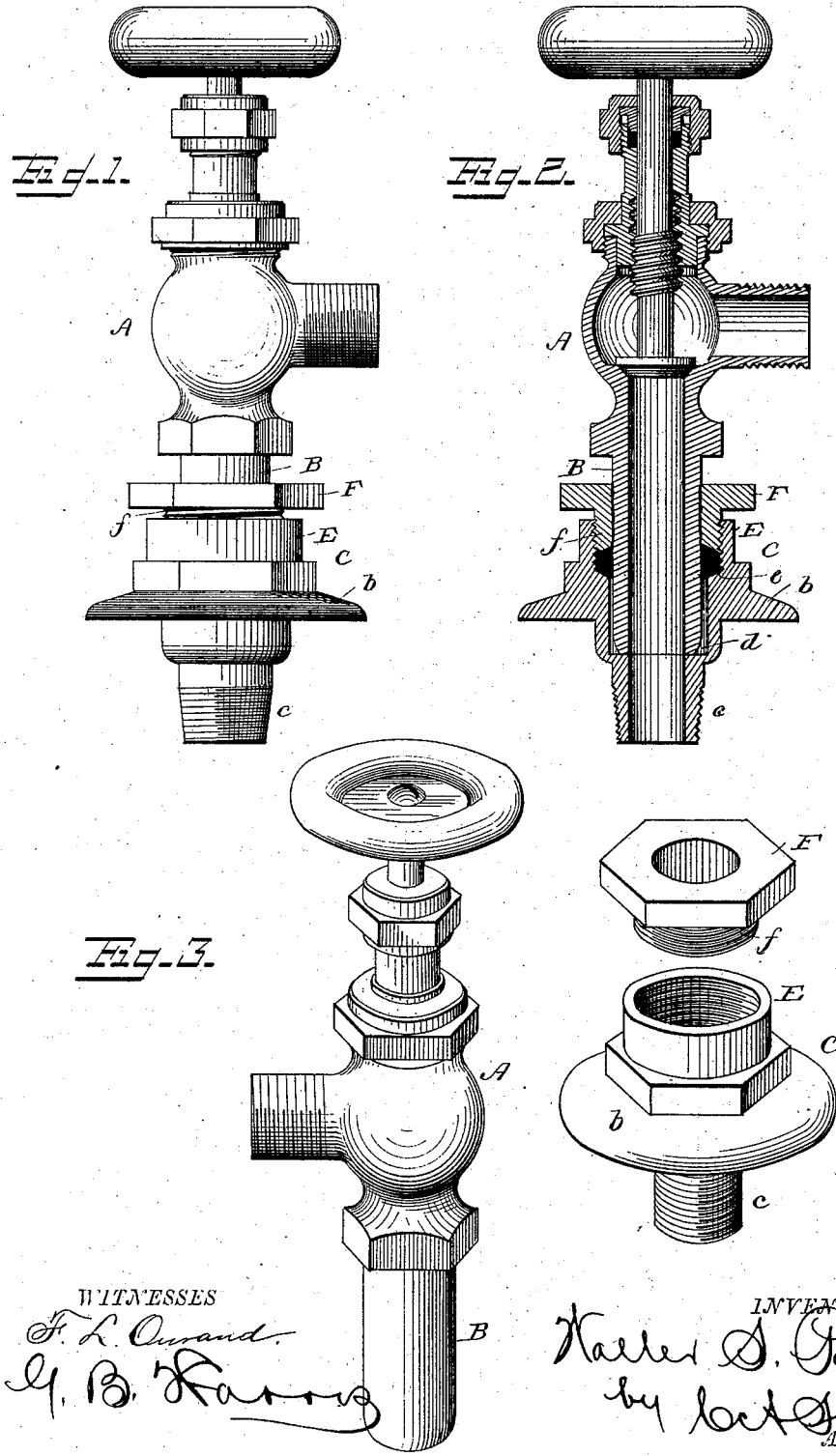

UNITED STATES PATENT OFFICE.

WALTER S. PAYNE, OF TITUSVILLE, PENNSYLVANIA.

RADIATOR-CONNECTION.

SPECIFICATION forming part of Letters Patent No. 302,021, dated July 15, 1884.

Application filed January 12, 1884. (No model.)

*To all whom it may concern:*

Be it known that I, WALTER S. PAYNE, a citizen of the United States, residing at Titusville, in the county of Crawford and State of Pennsylvania, have invented a new and useful Radiator-Connection, of which the following is a specification, reference being had to the accompanying drawings.

My invention relates to an improved means for connecting steam-pipes with the radiator; and it has for its object to provide a device whereby disconnection, when necessary, may be readily accomplished.

A further object of the invention is to provide a device for this purpose which shall be cheap and simple in its construction, durable in its use, and one that may be readily applied.

With the above-mentioned objects in view the invention consists in the improved construction and combinations of parts hereinafter fully described, and pointed out in the claim.

In the drawings, Figure 1 is a perspective view of my improvement applied to a valve. Fig. 2 is a vertical section of the same, and Fig. 3 is a detail perspective view of parts detached.

A represents the valve, which is of the ordinary construction, with the exception of the piston B, which is formed at the end of said valve and has connection therewith.

C represents what is termed the "floor-flange," the same consisting of a flange, $b$, having projecting from its lower end an extension, $c$, which is screw-threaded, as shown. This floor-flange C is adapted to be connected with the steam-pipe, which is carried to the proper point beneath the floor, a hole bored therein, and the floor-flange connected to the pipe, which is screw-threaded to receive it. Upon the upper side of the flange $b$ is formed an extension, E. A short distance above the rim or flange $d$ is a flange, $e$, which is formed by increasing the diameter of the space within the extension E. The upper portion of this extension E is screw-threaded, to receive a flange, F, having the downwardly-projecting screw-threaded extension $f$, a packing of asbestus or other material being placed within the extension E, so that when the piston B is inserted therein a perfectly steam-tight joint is formed.

The operation of my improvement will be apparent, and is as follows: The steam-pipe is brought to the proper position beneath the floor, a hole bored therein, and the floor-flange inserted and connected to said pipe. The valve, with the piston attached, is then screwed into the radiator securely, and the radiator set in position, which forms a stuffing-box for said piston. The valve is then connected to the radiator by a pipe adjusted upon the screw-threaded portion of the valve.

Having fully described my invention, what I claim as new, and desire to secure by Letters Patent, is—

The herein-described connection, consisting of a flange having a downwardly-projecting screw-threaded extension, said extension being provided with an inner shoulder, a stuffing-box formed at the upper end of said flange, said stuffing-box having an interior screw-thread, a flange, F, having the screw-threaded extension $f$, and a packing of asbestus, substantially as set forth, in combination with the piston B of the valve A, said piston resting upon the shoulder $d$.

In testimony that I claim the foregoing as my own I have hereto affixed my signature in presence of two witnesses.

WALTER S. PAYNE.

Witnesses:
JOHN O'NEILL,
E. G. SIGGERS.